July 26, 1932.  F. J. TIPPEN  1,868,859
SHOCK ABSORBER
Filed April 12, 1930   2 Sheets-Sheet 1
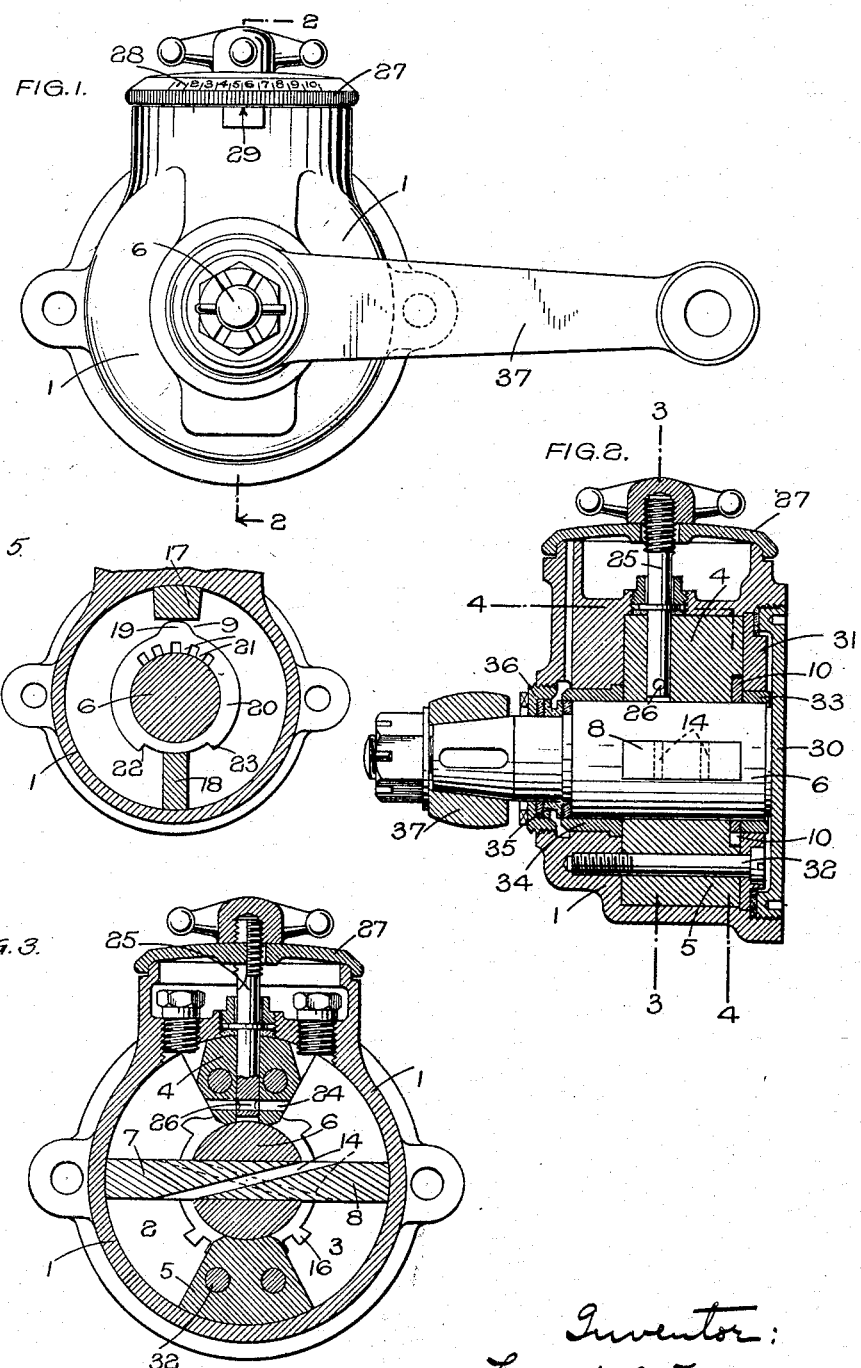

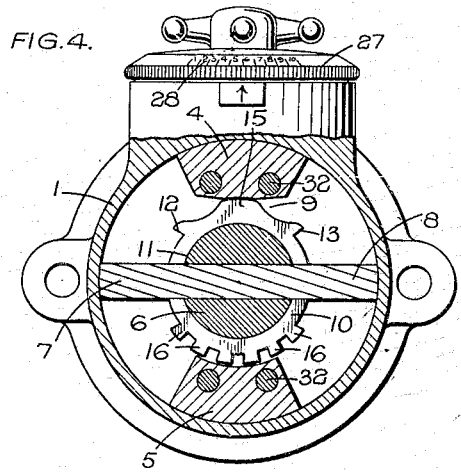
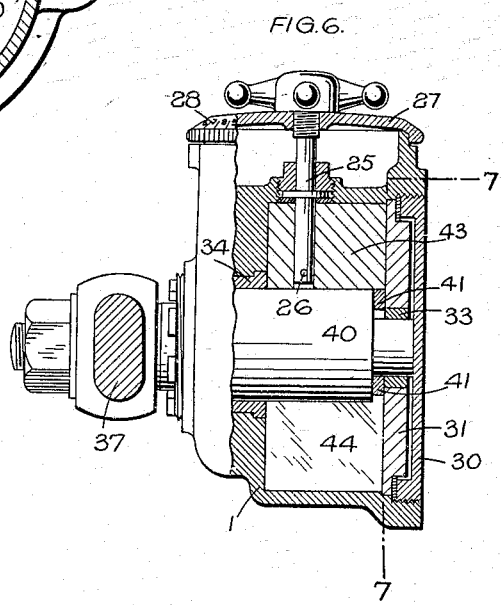
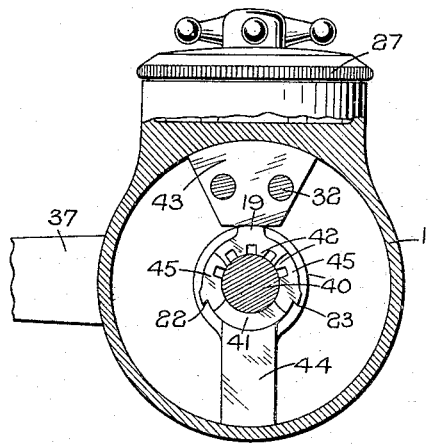
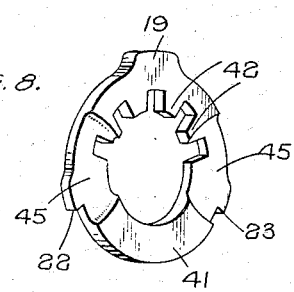

Patented July 26, 1932

1,868,859

UNITED STATES PATENT OFFICE

FRANK JOHN TIPPEN, OF EARLSDON, COVENTRY, ENGLAND, ASSIGNOR TO JOSEPH LUCAS LIMITED, OF BIRMINGHAM, ENGLAND

SHOCK ABSORBER

Application filed April 12, 1930, Serial No. 443,759, and in Great Britain May 27, 1929.

This invention relates to shock absorbers of the "dash pot" type wherein a braking effect is obtained by restricting the flow of a fluid through an opening.

My invention is particularly but not exclusively applicable to that type of shock absorber which is provided for use in checking the action of vehicle springs, and wherein the shock absorber comprises a cylindrical casing, the interior of which is provided with one or more blocks so that one or more sector-shaped chambers are formed within the casing, in each of which a vane is located, the vane or vanes being carried by a pin which is coupled to the vehicle spring or other member, the motion of which is to be damped, so that movement thereof tends to turn the pin and move the vane or vanes in the chamber or chambers which are filled with liquid.

In this type of apparatus it has already been proposed to provide an arrangement for checking the rebound of a vehicle spring after it has been forced upwardly owing to the wheel of a vehicle passing over an obstruction. One of the object of the present invention is to provide means for allowing the vehicle spring comparatively free action as regards movement from the normal position, (i. e. the position of the spring when the vehicle is at rest) but to check the action of the spring in its return to the normal position either when the spring has been forced upwardly, which occurs when the wheel meets an obstruction, or when the spring moves downwardly, which occurs when the wheel drops into a hole or depression, so that the known disadvantages of a shock absorber which damps equally in both directions, thus being equal to a stiffer spring, or a shock absorber which only damps in one direction, thus being equal to a stiffer spring in one direction, are avoided leaving the spring free to move when following the axle either over a bump or into a hole, but slowly dissipating the energy stored in the spring by either of the motions when the spring is returning to its normal position.

According to the present invention I provide damping means for shock absorbers wherein damping is effected by restricting the passage of a fluid through an opening, comprising a plate or member which is automatically moved into a position to permit relatively free flow during movement of the member, the motion of which is to be damped away from its normal position, and which is automatically moved into a position in which it restricts flow during return movement of the member, the motion of which is to be damped, to the normal position.

For instance, for checking the action of a spring in its return to the normal position after being stressed, I provide a passage from one liquid chamber to another, or in the case of a single chamber, from one end of the chamber to the other, and I control the effective cross sectional area of this passage by means of a plate or member which has a limited free movement in relation to a pin with which vanes are associated, the arrangement being such that the plate or member is shaped at its periphery or otherwise so that as it turns on the said pin, the cross sectional area of the passage for liquid is varied to permit the valves a relatively free movement for any departure of the spring from its normal position, but so to reduce the cross sectional area of the passage so as to restrict the flow of liquid through the passage during the return of the spring to its normal position.

At the initial movement from the normal position a pressure is immediately generated upon one side of each vane, and this pressure acts upon shoulders or projecting portions of the plate or member and causes it to turn until other shoulders or projections thereon come into contact with the vane. When it reaches this position the said plate or member permits relatively free flow of the liquid from one chamber to the other, so that the motion of the vane is not seriously checked.

At the beginning of the return movement a liquid pressure is at once generated upon one side of each vane (the opposite side from where the pressure previously occurred). This pressure immediately acts upon the plate or member and turns it upon the pin which carries the vane until shoulders on the plate or member come into contact with the vane. When this position is reached the said plate or member is obstructing the passage for fluid to such an extent that the cross sectional area of the passage is very much reduced, so that the return movement of the vane to the normal position is checked and delayed. The plate continues to obstruct the passage for fluid until the normal position is reached, the plate moving with the vane. When the normal position is reached, the shape of the periphery of the plate allows of a relatively quick increase in the area for the passage of fluid.

Referring to the drawings:—

Figure 1 is a view in end elevation showing one form of the apparatus.

Figure 2 is a part sectional side view taken on line 2—2 of Figure 1.

Figure 3 is a sectional end view taken on line 3—3 of Figure 2.

Figure 4 is a sectional end view on line 4—4 of Figure 2.

Figure 5 is a sectional end view showing a modification.

Figure 6 is a view in side elevation partly in section showing a modification.

Figure 7 is a sectional end view taken on line 7—7 of Figure 6.

Figure 8 is a perspective view showing the modified form of plate.

In the constructions illustrated, the cylindrical casing 1 is divided into two chambers 2, 3 of sector-like form by suitable blocks 4, 5 which may be of somewhat sector shape in section, while the pin 6 which is coupled to the spring or other member to be damped is arranged centrally in the chamber and carries two vanes 7, 8 one of which works in each of the chambers 2, 3.

The passage 9 for fluid from one chamber to the other (or from one end of the chamber to the other) may be cut or formed in the end of the block 4, and this passage may either have a straight side or a curved side.

The plate or member 10 which controls the cross sectional area of the passage 9 is provided with a central hole 11 by which it can be mounted upon the pin 6, and it is provided with peripheral projections 12, 13, which act as shoulders or stops co-operating with the vanes 7, 8, to limit its free movement.

The periphery of this plate or member 10 is cut to a shape found by experiment or calculation to permit free flow of the liquid from one chamber to the other through the passage 9 when the spring is being stressed, but to check the flow when the spring is returning to the normal.

In the construction shown in Figures 1 to 4, the interior of the casing is formed into two sector-shaped members 2, 3, by two oppositely disposed blocks 4, 5, and the pin 6 is provided with two oppositely arranged vanes 7, 8, thus dividing each chamber into two compartments. The opposite compartments 2 and the two opposite compartments 3 are placed in communication with each other by passages 14 controlled or formed through the vanes.

With such an arrangement it is necessary to provide for the passage of liquid past only one of the blocks (the block 4) and in this construction the plate 10 has that part of its periphery which governs the flow of liquid formed as shown at 15 to arcuate shape, but not necessarily concentric with the pin 6.

That part of the periphery of the plate 10 which is disposed opposite to the part 15 may be cut into a number of teeth 16 which may be radially disposed so that the pressure of the liquid finds a number of shoulders, formed by the sides of these teeth, to act upon for actuating the plate 10.

In the arrangement shown in Figure 5, the interior of the casing 1 is formed into a single chamber by using only one block 17 and a single vane 18 is used, and the part 19 of the periphery of the plate 20 which governs the flow of liquid from one end of the chamber past the block 17 to the other end of the chamber is shaped similarly to the part 15, i. e., it is of arcuate form.

In this arrangement, instead of cutting teeth in the opposite portion of the periphery of the plate, teeth 21 are cut in the internal surface of the plate or ring where it fits on to the pin 6, and these teeth are at the same side of the plate as that where the liquid controlling portion of the periphery is situated. These teeth 21 provide shoulders upon which the pressure of the liquid can act to actuate the plate and liquid is conveyed from one side of the block to the other in the gaps or spaces between the teeth.

The plate 20 has shoulders 22 and 23 which co-operate with the vane 18 to limit the free movement of the plate.

According to a further feature of my invention, I may provide, if required, a direct passage for the liquid from one chamber to the other (or from one end of the chamber to the other end) by machining or forming one or more passages, such as 24, of relatively small cross sectional area in one or more of the blocks which separate the chambers. The cross sectional area of such passages may be controlled by means of valves, such as 25, each having a part 26 which can be made to register more or less with such passages 24. These valves may be adjusted or set by hand from the exterior of the casing by an operating member 27 which may be formed as a marked dial, as shown at 28, co-operating with a mark 29 on the casing to indicate the position of the valve.

The casing 1 may be formed as a single casting with one end open but adapted to be closed by a cover 30 screwed into position. An inner cover plate 31 is secured by axially arranged screws 32 also passing through the blocks 4 and 5 within the casing.

It is to be understood that the pin 6 extends into the casing and is provided with suitable bearings 33 and 34 therein. One end of the pin projects from the casing while the other end of the pin is enclosed within the casing. The bearing for the pin at the end where it projects from the casing is constructed with packing 35 and a gland 36 to make it liquid-tight.

The pin 6 is provided with a lever 37 which is connected to the spring or other member, the motion of which is to be damped.

In operation Figure 4 shows the parts in the normal position. Assuming that the spring or member to be damped is deflected or moved then the pin 6 will be turned. Assuming that the pin 6 is turned in an anti-clockwise direction, the vanes 7 and 8 will create a pressure in the upper part of the chamber 3, and the lower part of the chamber 2. This pressure will act upon the teeth 16 and upon the shoulder 13 and will instantaneously turn the plate 10 in an anti-clockwise direction until its shoulder 12 comes into contact with the vane 7, thus bringing the part 15 out of the passage 9 and permitting free passage of the fluid from the upper part of the chamber 3 to the upper part of the chamber 2. Thus, the vanes 7 and 8 are permitted to move in an anti-clockwise direction freely.

The vanes are now in a position such that the vane 7 is near to the projection 5 on the casing.

When the motion of the spring or other member to be controlled reverses the pin 6 commences to move back in a clockwise direction to its normal position, and a pressure is quickly created in the lower part of the chamber 3.

This pressure acts upon the teeth 16 and rotates the plate 10 on the pin 6. The amount of rotation is however limited by the engagement of the shoulder 13 with the vane 8 and as the vanes have scarcely started their reutrn movement the plate 10 is only rotated until it reaches approximately the position it occupies in Figure 4. The vanes are still in an inclined position adjacent the projections 4 and 5 and the plate 10 is prevented from moving further by engagement of the shoulder 13 with the vane 8. In this position of the plate 10, as shown in Figure 4, the projection 15 prevents free passage of fluid through the passage 9 and the movement of the vanes, and the plate 10 which can only move with the vanes, is retarded and damped until the projection 15 moves out of the passage 9.

Thus the return movement only proceeds slowly as the fluid prevents rapid movement of the vanes since it can only escape by leaking slowly round the plate 10.

Variations may be made in the shape of the part 15 so as to confine the checking of the return movement to a part of the movement back to the normal, instead of the whole of the movement back to the normal.

The operation is exactly the same if the initial movement of the pin 6 is in a clockwise instead of an anti-clockwise direction, as the construction is symmetrical.

The operation of the device shown in Figure 5 is similar; the movement of the pin causes the vane to create a pressure in the chamber on one side of it, and this moves the plate 20 until either the shoulder 22 or the shoulder 23 comes into contact with the vane 18, thus moving the projecting part 19 out of the passage under the block so that the movement of the pin away from normal is a free movement. The return movement, however, first brings about the return of the plate 20 to a position in which the part 19 almost blocks the passage for fluid, and this blocking or checking position is retained until the whole or any part of the return movement of the vane has taken place.

In the modified arrangement shown in Figures 6, 7, and 8, the construction is similar to that shown in Figure 5 but the pin 40 is of large diameter so that the plate 41 having internal teeth 42 which are similar to the teeth 21 is disposed within the diameter of the pin 40 and is thus surrounded by the metal of the pin 40, the block 43, the vane 44 and the end plate 31 of the casing so that the liquid is only in direct communication with the teeth 42 by reason of the fact that the plate 41 is provided with two facial grooves 45 which allow the liquid to reach the teeth 42.

I claim:—

1. A shock absorber comprising a chamber for fluid, an operating member movable in said chamber, means associated with the operating member for forcing fluid through a restricted passage, and a valve controlling the cross sectional area of said passage, said valve being mounted to move on movement of said operating member and having a portion which moves out of said passage during movement of the operating member away from its normal position, but returns into said passage during return movement of the operating member to its normal position.

2. A shock absorber comprising a chamber for fluid, an operating pin rotatably mounted in said chamber, a vane on said pin, a block projecting into said chamber, an opening for fluid formed between said block and said pin, a plate mounted for partial rotation on said pin and constituting a valve controlling said opening, means on said plate forming stops to limit its free rotary movement on said pin in either direction, and a projection on said plate which moves automatically out of said passage during movements of the operating pin from the normal position, but returns automatically into said passage during return movements of the operating pin to its normal position.

3. A shock absorber comprising a chamber for fluid, an operating member movable in said chamber, means, associated with the operating member for forcing fluid through a restricted passage, and a valve controlling the cross sectional area of said passage, said valve being mounted to move, and having a portion which moves out of said passage and permits free flow of the fluid through said passage during movements of the operating member from its normal position, and is automatically moved back into said passage so as to restrict flow of the fluid during return movements of the operating member.

4. A shock absorber comprising a chamber for fluid, an operating pin rotatably mounted in said chamber, a vane on said pin, a block projecting into said chamber, an opening for fluid formed between said block and said pin, a plate mounted for partial rotation on said pin and constituting a valve controlling said opening, shoulders on said plate co-operating with said vane to form stops to limit the motion of the plate on the pin and a projection on said plate which moves automatically out of said passage during movements of the operating pin from the normal position, but returns automatically into said passage during return movements of the operating pin to its normal position.

5. A shock absorber comprising a cylindrical chamber for fluid, an operating pin disposed axially in said chamber and mounted for oscillating movement therein, a vane fixed on said pin and projecting radially therefrom, a fixed block projecting inwardly from the wall of said chamber, and arranged oppositely to said vane in its normal position, said vane and said block each having recesses in their ends, a plate mounted for oscillation on said pin and located in said recesses, said plate having a projection which normally substantially fills the recess in the block, and means on said plate forming stops to limit its free rotary movement on said pin in either direction.

6. A shock absorber comprising a cylindrical chamber for fluid, an operating pin disposed axially in said chamber and mounted for oscillating movement therein, a vane fixed on said pin and projecting radially therefrom, a fixed block projecting inwardly from the wall of said chamber, and arranged oppositely to said vane in its normal position, said block having an opening therethrough, a valve controlling the passage of fluid through said opening, said vane and said block each having recesses in their ends, a plate mounted for oscillation on said pin and located in said recesses, said plate having a projection which normally substantially fills the recess in the block, and means on said plate forming stops to limit its free rotary movement on said pin in either direction.

7. A shock absorber comprising a chamber for fluid, an operating pin rotatably mounted in said chamber, a vane on said pin, a block projecting into said chamber, an opening for fluid formed between said block and said pin, a plate mounted for partial rotation on said pin and constituting a valve controlling said opening, teeth on said plate for receiving fluid pressure, means on said plate forming stops to limit its free rotary movement on said pin in either direction, and a projection on said plate which moves automatically out of said passage during movements of the operating pin from the normal position but returns automatically into said passage during return movements of the operating pin to its normal position.

8. A shock absorber comprising a cylindrical chamber for fluid, an operating pin disposed axially in said chamber and mounted for oscillating movement therein, a vane fixed on said pin and projecting radially therefrom, a fixed block projecting inwardly from the wall of said chamber, and arranged oppositely to said vane in its normal position, said vane and said block each having recesses in their ends, a plate mounted for oscillation on said pin and located in said recesses, teeth on said plate for receiving fluid pressure, said plate having a projection which normally substantially fills the recess in the block, and means on said plate forming stops to limit its free rotary movement on said pin in either direction.

9. Shock absorbing or damping apparatus for checking the action of a spring in its return to the normal position after being stressed, comprising a chamber for fluid, means for dividing said chamber into a plurality of compartments, a pin mounted for rotation in said chamber, vanes associated with said pin, and a plate mounted for limited rotation on said pin and adapted to control the effective cross sectional area of a passage connecting said compartments, said plate being shaped so that as it turns on the said pin the cross sectional area of the passage for liquid is varied to permit the vanes a relatively free movement for any departure of the spring from its normal position, but to reduce the cross sectional area of the passage, so as to restrict the flow of liquid through said passage, during the return of the spring to its normal position.

10. A shock absorber comprising a chamber for fluid, an operating pin rotatably mounted in said chamber, a vane on said pin, a block projecting into said chamber, an opening for liquid formed between said block and said pin, a plate mounted for partial rotation on said pin and constituting a valve controlling said opening, teeth on said plate for receiving fluid pressure, a passage adjacent the face of said plate for fluid, means on said plate forming stops to limit its free rotary movement on said pin in either direction, and a projection on said plate which moves automatically out of said passage during movements of the operating pin from the normal position, but returns automatically into said passage during return movements of the operating pin to its normal position.

In witness whereof I affix my signature.

FRANK JOHN TIPPEN.